United States Patent [19]
Iba et al.

[11] 3,797,287
[45] Mar. 19, 1974

[54] STEERING SYSTEM LOCK FOR DIESEL POWERED MOTOR VEHICLES

[75] Inventors: Yoshio Iba; Yutaka Tomizu, both of Aichi-ken, Japan

[73] Assignee: Toyota Jidosha Kogyo Kabushiki Kaisha, Toyota-cho, Japan

[22] Filed: May 1, 1972

[21] Appl. No.: 249,083

[30] Foreign Application Priority Data
Aug. 24, 1971 Japan............................. 46-63995

[52] U.S. Cl. .................... 70/239, 70/243, 70/252, 70/257
[51] Int. Cl. ...................... B60r 25/04, B60r 25/02
[58] Field of Search ............. 70/239, 243, 252, 257

[56] References Cited
UNITED STATES PATENTS
| | | | |
|---|---|---|---|
| 1,714,426 | 5/1929 | Kuepfer | 70/252 |
| 2,101,348 | 12/1937 | Schellinger | 292/141 |
| 2,913,894 | 11/1959 | Gieray et al. | 70/237 |
| 3,236,077 | 2/1966 | Moss | 70/239 |

FOREIGN PATENTS OR APPLICATIONS
| | | | |
|---|---|---|---|
| 196,111 | 2/1938 | Switzerland | 70/252 |

Primary Examiner—Albert G. Craig, Jr.
Attorney, Agent, or Firm—Toren, McGeady and Stanger

[57] ABSTRACT

A steering system lock device for a Diesel powered motor vehicle includes, in combination, a key cylinder assembly for locking the steering shaft of the vehicle and an engine shut-down device for starting and stopping the vehicle engine. By inserting a key, the key cylinder assembly can be displaced between several positions including a locked position for the steering shaft. A push-pull connector cable extends between the key cylinder assembly and the engine shut-down device to operatively connect to each other. The key cylinder assembly can be displaced in a position for locking the steering shaft by a key only during the engine stop by operation of the engine shut-down device. On the other hand, the key cylinder assembly is prevented from displacing into the locking position during operation of the engine.

6 Claims, 7 Drawing Figures

STEERING SYSTEM LOCK FOR DIESEL POWERED MOTOR VEHICLES

BACKGROUND OF THE INVENTION

The present invention is directed to a steering system lock for a Diesel powered motor vehicle and, more particularly, it concerns the combination of a steering shaft lock with a shut-down device for the Diesel engine. To stop the operation of the engine in a Diesel powered motor vehicle, an engine stopping device is required, such as a fuel cut-off device or a decompressing device. If a Diesel powered motor vehicle is equipped with a steering lock device such as used in a gasoline powered vehicle in which the steering is locked merely by turning off the electric system, there is the dangerous possibility that the Diesel powered motor vehicle might start-up with the steering shaft locked. For instance, if a Diesel powered motor vehicle should begin to roll down an incline where it has been parked, the Diesel engine may be caused to rotate even though the steering system is locked and a runaway vehicle might result.

SUMMARY OF THE INVENTION

It is the primary object of the present invention to provide an anti-theft lock for the steering system in a Diesel powered motor vehicle which prevents any unintentional locking of the steering while the Diesel engine is operating and also prevents any possibility of the Diesel engine starting up when the steering shaft of the vehicle is locked.

Another object of the invention is to provide a locking system which is simple in construction and operates with great reliability.

Therefore, in accordance with the present invention, a key cylinder assembly for starting up a Diesel engine and locking the steering shaft of the vehicle is used in combination with a Diesel engine shut-down device so that the steering shaft cannot be locked while the Diesel engine is operating and the engine cannot be started up while the steering shaft is locked.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
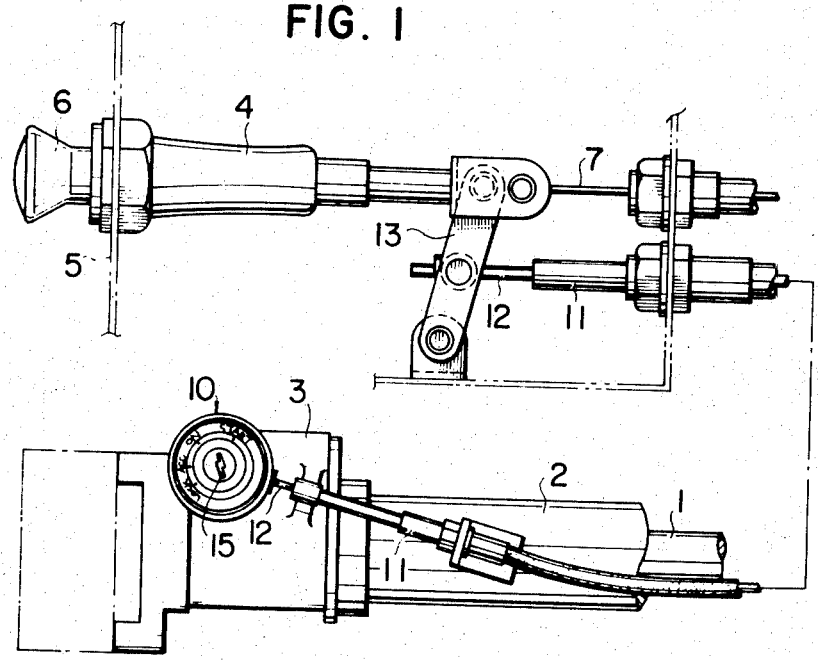
FIG. 1 is a schematic illustration of the combination of a steering system lock device and a Diesel engine shut-down device embodying the present invention.

As shown schematically in FIG. 1, the steering system for a motor vehicle includes a steering column 2 enclosing a steering shaft 1 to which a steering wheel, not shown, is attached for rotating the steering shaft. An upper bracket 3 is mounted on the steering column 2. Spaced from the steering column is a Diesel engine shut-down device 4 which has a knob 6 mounted on one end of the device and located on an instrument panel 5. The knob 6 is displaceable relative to the instrument panel 5 and is connected by means of a flexible cable 7 to an fuel injection pump, not shown, for controlling the flow of fuel to the Diesel engine.

In the present invention the steering system lock includes the combination of the lock device for the steering shaft and the Diesel engine shut-down device. Mounted on the upper bracket 3 and extending transversely of the steering column 2 is a key cylinder assembly 10. A push-pull cable 11 extends from the engine stop device 4 to the key cylinder assembly 10. At one end, an inner cable 12 of the push-pull cable 11 is connected by a link mechanism 13 to the flexible cable 7 so that the movement of the flexible cable 7 obtained through the displacement of the knob 6 is transmitted to the push-pull cable 11 by means of the link mechanism 13. At the opposite end of the cable 11 its inner cable 12 is selectively displaceable between engagement within or in contact with the surface of the key cylinder assembly.

Figure 2:
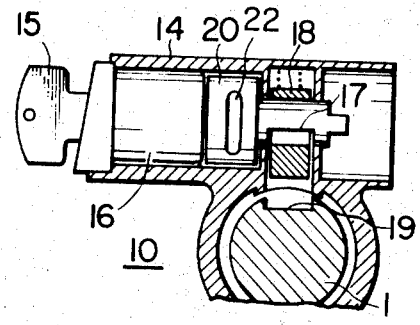
FIG. 2 is a cross sectional view through the steering system lock device shown in FIG. 1.
Figure 3:
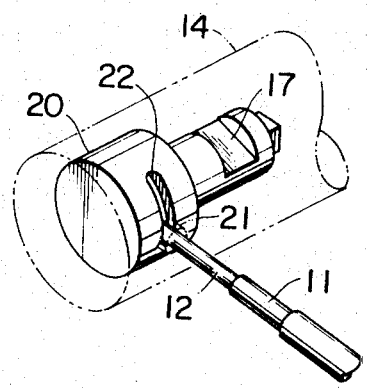
FIG. 3 is a perspective view of a portion of the steering system lock device shown in FIG. 1 with a member which interconnects the steering system lock device and the engine shut-down device.

As shown in FIGS. 2 and 3, the key cylinder assembly 10 includes a cylinder 14 formed integrally with the upper bracket 3 and extending transversely of the steering column 2. As indicated in FIG. 2, a key 15 extends into the cylinder 14 and fits within a shaft 16 which is rotatably movable within the cylinder in response to the movement of the key. By turning the key, the shaft 16 can be rotated within the cylinder 14 into any of the START, ON, ACC AND LOCK positions. Further, the key cylinder assembly 10 is provided with a steering shaft locking mechanism similar to the type used in motor vehicles having gasoline engines. In such vehicles, when the key is turned into the LOCK position, a cam surface 17 on the shaft 16 is positioned so that a spring biased locking bar or bolt 18 is directed into a recess 19 in the steering shaft 1 within the steering column for locking the steering system.

Figure 4:
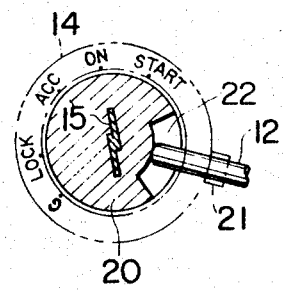
FIGS. 4 to 7 are cross sectional views of the arrangement shown in FIG. 3 indicating various relative positions of the steering system lock device and the interconnecting member between the lock device and the engine shut-down device.
Figure 5:
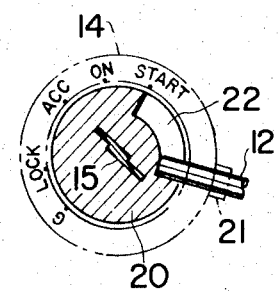
Figure 6:
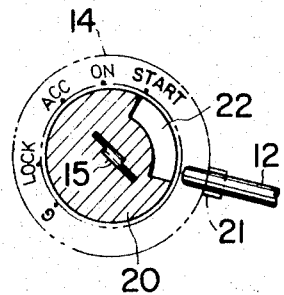
Figure 7:
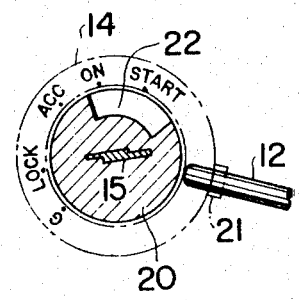

Within the cylinder 14, a change-over or switch controlling member 20 is positioned on the shaft 16 and a hole formed in the cylinder 14 permits the inner cable of the push-pull cable to be inserted into the interior of the cylinder. In the circumferential periphery of the switch controlling member 20, adjacent the hole 21, is an elongated slot 22 having its elongated direction disposed transversely of the axis of the cylinder 14. As can be seen in FIGS. 4 to 7, the end of the inner cable 12 is selectively insertable into the slot 22 in dependence on the position of the switch controlling member 20 on the shaft 16. As can be seen in FIGS. 4 and 5, when the end of the inner cable 12 is located within the slot 22 the switch controlling member 20 can only be moved between the ACC and the START positions which includes between them ON position. It is not possible for the key to be turned into the LOCK position when the inner cable 12 is located within the slot 22. As shown in FIGS. 6 and 7, if the inner cable 12 is displaced outwardly from the slot then the key can be turned into the LOCK position.

In the stop device 4 for the Diesel engine, when the knob 6 is pulled outwardly from the instrument panel 5, the flexible cable 7 in operative engagement with the knob is displaced into a position for cutting off the supply of fuel to the engine and thus shutting down its operation. At the same time, due to the link mechanism 13, the inner cable 12 of the push-pull cable 11 is moved so that the end of the inner cable 12 is displaced outwardly from the slot 22, as shown in FIG. 6. With the end of the inner cable removed from the slot, the shaft 16 and the switch controlling member 20 can be rotated by the key into the LOCK position so that the steering shaft 1 is locked within the steering column 2 when the cam surface 17 is arranged for permitting the lock bolt 18 to drop into the recess 19 in the steering shaft. Accordingly, when the Diesel engine is operating and the end of the inner cable 12 is located in the slot 22 it is not possible to turn the key 15 so that the steering shaft is locked. Therefore, the locking of the steering system cannot be effected unless the knob 6 is pulled outwardly. Before the engine can be started, the key 15 must turn the shaft 16 and the switch controlling member 20 at least to the ACC position, note FIG. 5, so that the end of the inner cable 12 can move into the slot 22 and permit the knob to be pushed inwardly for supplying fuel to the engine. In the position shown in FIG. 7, the end of the inner cable 12 abuts the circumferential peripheral surface of the switch controlling member 20 and it is not possible for the inner cable 12 to move and, as a result, it prevents the start-stop device 4 from putting the Diesel engine in an operable condition. Accordingly, when the key cylinder assembly is in the LOCK position the knob remains in its pulled-out position and the Diesel engine cannot be operated. Therefore, by means of the above-described steering system lock device, in a Diesel powered motor vehicle the locking device on the steering system can be provided by the combination of a steering system lock mechanism and a Diesel engine stop device. The steering lock device has a number of advantages. First, the entire structure of the device is simple since the stop device for the engine and the steering lock mechanism are merely connected by a single push-pull cable 11 and, as a result, the means used in operating the stop device can be located at a conventional position on the instrument panel or dashboard and there is no need for remodeling the structure of the vehicle to any significant extent. Further, since the key in the key cylinder assembly cannot be turned to the LOCK position while the engine is in operation, there is no danger that the steering mechanism will become locked while the vehicle is running. In addition, when the steering mechanism is in the LOCK position the engine cannot be operated, because the end of the inner cable 12 abuts against the circumferential peripheral surface of the switch controlling member 20 and prevents the stop device from being actuated. With the inner cable 12 held against displacement, the flexible cable 7 cannot be moved and there is no danger of a spontaneous ignition of the engine if the vehicle starts to roll down a slope.

The method of locking the steering both by pulling the knob 6 of the stop device 4 for the engine and by turning the key 15, as used in the present device, is generally called a two-operation system. This system is one in which one part of the two-operation steering lock system for gasoline powered vehicles is substituted for by an engine stopping operation. This system provides a structure with extremely high safety. Accordingly, if the device of the present invention is applied to a two-operation steering lock system and used in a Diesel powered motor vehicle, it is possible to obtain a steering lock device with triple safety means. Although a push-pull knob has been used as the means for stopping the engine, it will be appreciated that the above arrangement can also be used where a decompressing lever is employed rather than the knob.

While a specific embodiment of the invention has been shown and described in detail to illustrate the application of the inventive principles, it will be understood that the invention may be embodied otherwise without departing from such principles.

What is claimed is:

1. A steering system lock for a diesel engine powered vehicle including a steering shaft comprising, in combination, locking means operably displaceable between a plurality of positions, means operable in response to movement of said locking means for locking said steering shaft when said locking means is in one of said plurality of positions, a switch controlling member movably displaceable with said locking means, engine shut-down means movably displaceable to a position for shutting down said engine, cable means connected with said shut-down means to be movable therewith and extending in operative relationship with said switch controlling member, and slotted means defined in said switch controlling member for selectively engaging said cable means, said slotted means being configured to engage said cable means to prevent movement of said locking means to said one plurality of positions locking said steering shaft when said engine is operating, said switch controlling member being configured to engage said cable means to prevent movement of said shut-down means out of said position for shutting down said engine when said locking means is in said one plurality of positions locking said steering shaft.

2. A steering system lock according to claim 1 wherein said locking means is rotatably movable to said plurality of positions, said switch controlling member being cylindrically shaped and rotatably movable with said locking means, said slotted means being defined therein as an elongated slot formed on the circumferential periphery of said switch controlling member, said cable means having a pair of ends, with one end connected for movement with said engine shut-down means and with the other end extending for operative engagement with said switch controlling member, said switch controlling member being configured to prevent said other end to extend into said slot when said locking means is not in said position locking said steering shaft, and to prevent movement of said other end into said slot when said locking means is in said position locking said steering shaft.

3. A steering system lock according to claim 2 wherein said engine shut-down means includes a member manually displaceable between a position cutting off fuel flow to said diesel engine and a position permitting fuel flow thereto, said lock including a link mechanism connecting said one end of said cable means with said manually displaceable member for corresponding movement therewith.

4. A steering system lock according to claim 1 wherein said locking means includes a shaft having a cam surface thereon and a spring biasing lock bar associated with said shaft and arranged to drop into lock engagement with said steering shaft when said locking means is in said steering shaft locking position.

5. A steering system lock according to claim 2 wherein said locking means includes a key cylinder assembly operably displaceable by means of a key, a cylinder, a shaft rotatably mounted within said cylinder for rotational displacement by said key, said switch controlling member being positioned within said cylinder and in engagement with said shaft for rotational displacement therewith.

6. A steering system lock according to claim 5 wherein the elongated direction of said slot in said switch controlling member extends normally to the axis of said shaft.

* * * * *